Sept. 23, 1947.  C. H. HAVILL  2,427,783
DRIVING APPARATUS
Filed May 18, 1943  3 Sheets-Sheet 1

INVENTOR.
Clinton H. Havill
BY
Martin J. Finnegan
Attorney

Sept. 23, 1947.  C. H. HAVILL  2,427,783
DRIVING APPARATUS
Filed May 18, 1943  3 Sheets-Sheet 2

INVENTOR.
Clinton H. Havill.
BY
Martin J. Finnegan
Attorney

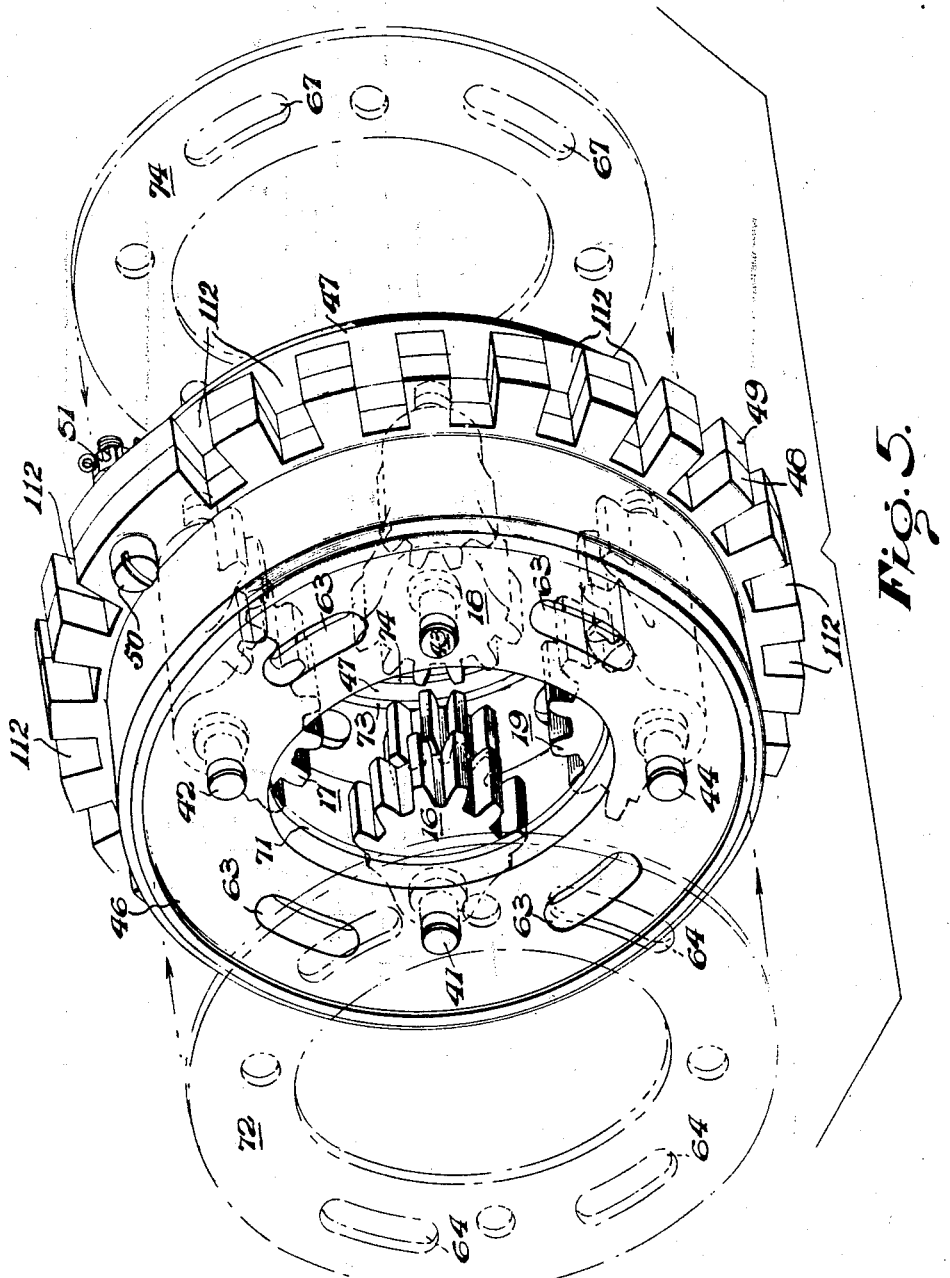

Patented Sept. 23, 1947

2,427,783

UNITED STATES PATENT OFFICE 2,427,783

DRIVING APPARATUS

Clinton H. Havill, South Orange, N. J., assignor to Bendix Aviation Corporation, Bendix, N. J., a corporation of Delaware Application May 18, 1943, Serial No. 487,526

8 Claims. (Cl. 64—27)

This invention relates to driving apparatus and particularly to apparatus of the type that is mechanically driven from a non-steady source of power, as, for example, an internal combustion engine.

Objects of the invention are to provide improved methods of, and means for, transmitting and controlling the transmission of energy from a driving source of power, for the purpose of achieving a steadier power input into the member to be driven, and at the same time minimizing the shock effect and fracture hazards that attend fluctuation in the turning effort applied from the driving source.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claims for this purpose.

In the drawings:

Fig. 5 is a view in perspective of a sub-assembly of the complete device of Fig. 1.

Figure 1:
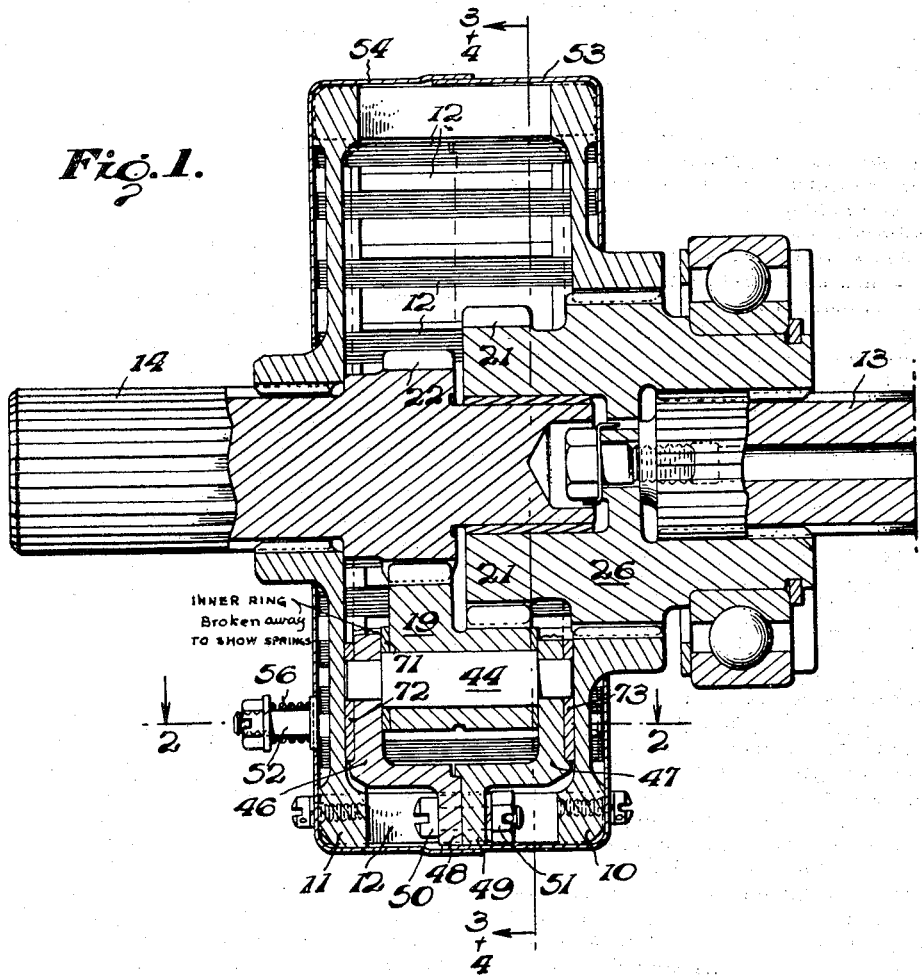
Fig. 1 is a longitudinal sectional view of a device embodying the invention.
Figure 2:
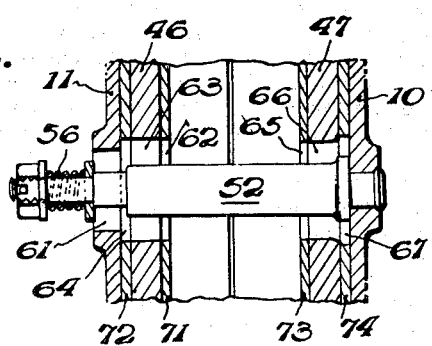
Fig. 2 is a view along line 2—2 of Fig. 1.
Figure 3:
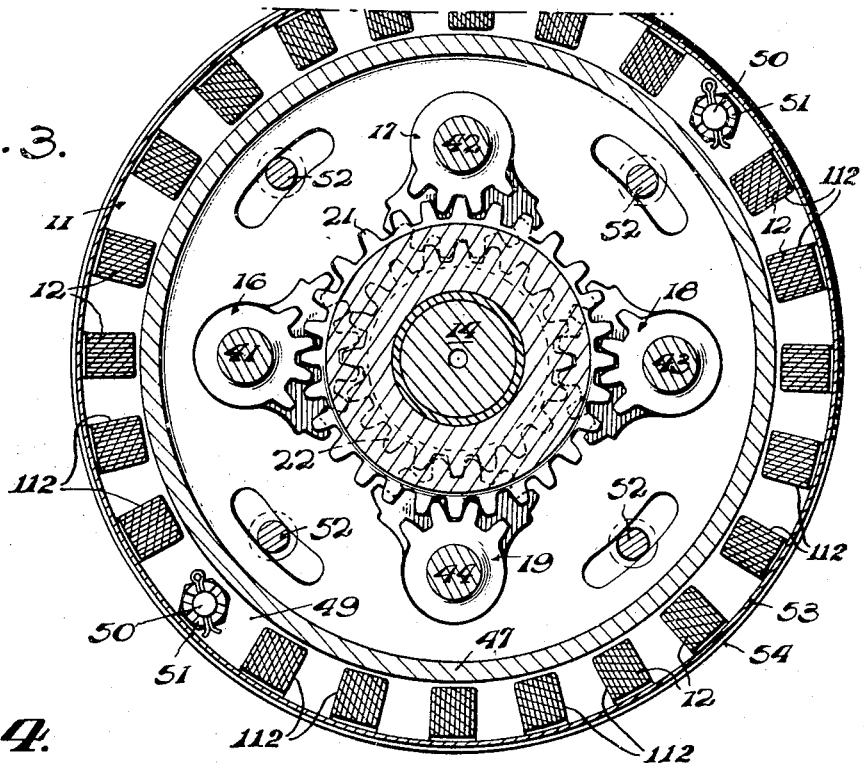
Fig. 3 is a view along line 3—3 of Fig. 1.

As shown best in Fig. 5 one phase of the invention is the provision of an inner torque transmitting sub-assembly to supplement the outer, spring-coupling type of torque transmitting means; the latter being shown in Figs. 1 and 3 as including a pair of peripherally slotted elements 10 and 11 connected by groups of flat resilient strips 12 of spring-steel or its equivalent, the strips 12 being packed into the peripheral slots of the members 10 and 11. These springs 12 will, in operation, serve to provide a certain degree of flexibility in the transmission of torque from member 10 to member 11 (or in the reverse direction, depending upon whether shaft 13 or shaft 14 is the driver). Such a flexible drive is sufficient, per se, where the load is not too great; but to provide increased power transmitting capacity, and at the same time incorporate inherent torque capacity over and above the torque capacity of springs 12, I have conceived the use of the means shown best in Fig. 5. As shown therein, said inner driving assembly includes a gear train in the form of a series of double spur gears 16, 17, 18, 19, each of which meshes with both the large central gear 21 and the smaller central gear 22, the latter being a part of shaft 14 and the former being a part of a sleeve element 26 having internal splines to engage shaft 13 and external splines to engage the hub of element 10. (The hub of element 11 is splined to shaft 14.)

The spur gears 16 to 19 are carried on shafts 41 to 44 having their ends journaled in the retainer plates 46 and 47, said plates being flanged, as at 48 and 49, to receive tie bolts 50, and nuts 51 and to define channels 112 through which the springs 12 extend. Other tie bolts 52 retain casing cups 53, 54 in overlapping position upon members 10 and 11, respectively. Springs 56 allow some axial play and create friction between the elements 10 and 47, and 11 and 46.

As the rotation of gear 21, differentially of gear 22, is limited by the magnitude of the maximum deflection of springs 12 (also, in case of extreme overload, by the length of arcuate slots 61 in member 11, and the correspondingly placed arcuate slots 62, 63, 64, 65, 66 and 67 in members 71, 46, 72, 73, 47 and 74, respectively) the spur gears 16 to 19 need have only a corresponding number of teeth along one segment of their peripheries, as shown; but, of course, if preferred, the teeth may extend throughout.

Upon an angular displacement of driving shaft 14 relative to driven shaft 13, the retainer plates 46 and 47 bear against springs 12 to deflect the latter. Since a short length of spring 12 is used, it is much stiffer than between elements 10 and 11 alone. Thus, in effect, each spring 12, through gears 18 and 19, forms a powerful resilient displacement-opposing means for the gears 21 and 22. By having the gears 21 and 22 approach unity ratio, there is an increase in the portion (of the total torque transmitted) carried by the gear train which ultimately becomes irreversible as is well known to workers in the mechanical art. In addition, the friction produced by springs 56 resist motion of the retainer plates 46 and 47 relative to their adjacent elements 10 and 11. The gear ratio may be readily selected so that the major portion of the torque will be transmitted by way of the intermeshed gear elements, and only a minor portion—corresponding to the resiliency and vibratory frequency of the springs 12—will be transmitted through the said springs 12, which latter will act as damping means for the oscillations of the spur gears 16 to 19.

Figure 4:
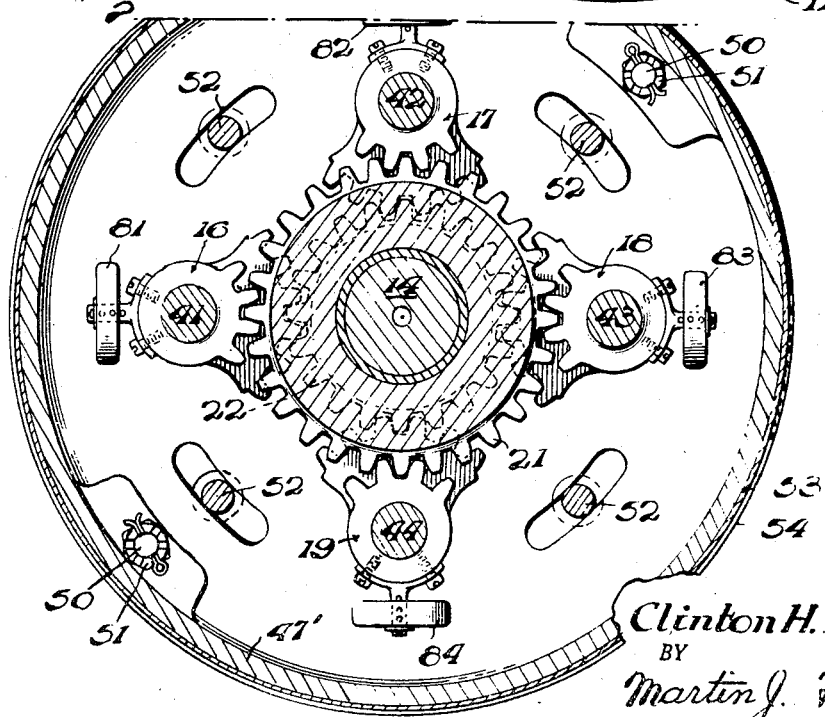
Fig. 4 shows a second embodiment of the invention.

In Fig. 4 I have shown a modification in which the springs 12 are eliminated, and in lieu thereof I substitute weights 81, 82, 83 and 84 attached to the spur gears 16, 17, 18 and 19, respectively, to damp the oscillations of said spur gears in proportion to the rotary speed attained—the weights being, of course, subject to the law of centrifugal force.

What is claimed is:

1. In an accessory drive betwee a driving shaft and a co-axial driven shaft, the combination of a first means operatively connecting the shafts to continuously flexibly carry a portion of the driving torque and including a resilient portion opposing relative angular displacement of the shafts, and a second means operatively connecting the shafts to continuously flexibly carry the complemental portion of the driving torque and including a respective element moving with each of the shafts and an angularly movable part continuously mechanically engaging each of said elements.

2. In an accessory drive between a driving shaft and a co-axial driven shaft, the combination of a first means operatively connecting the shafts to continuously flexibly carry a portion of the driving torque and including a resilient portion opposing relative angular displacement of the shafts; a second means operatively connecting the shafts to continuously flexibly carry the complemental portion of the driving torque and including a respective spur gear attached to each of the shafts, the gears having different pitch diameters, and an angularly movable part having two spur gear portions each continuously mechanically engaging a respective one of said gears; and means operatively connecting at least one of the shafts with the movable part to damp the latter's movement relative to such shaft.

3. A continuously torsionally-flexible driving coupling for a pair of co-axial shafts, comprising two spur gears of different pitch diameters each attached to its respective shaft, two spur gears unitarily connected together co-axially, a member angularly movable about the axis of the shafts and journalling the second-named gears to have their axis parallel with that of the shafts, and to have each of the second-named gears engage a respective one of those first-named, and resilient means connecting the ends of said shafts to continuously flexibly resist motion between the first-named shafts and operatively connecting at least one of shafts with said member to resist motion between such shaft and said member.

4. A driving coupling as set forth in claim 3 including a damping means for frictionally opposing relative angular motion between the member and at least one of the shafts.

5. A continuously torsionally-flexible driving coupling for a pair of co-axial shafts, comprising a first means operatively connecting the shafts to continuously flexibly carry a portion of the driving torque and including two elements each turning with a respective one of said shafts, a member angularly movable about the axis of the shafts, a torque-transmitting element continuously mechanically engaging each of the first-named elements, and a second means operatively connecting the shafts to continuously flexibly carry a portion of the driving torque and including resilient portions opposing angular displacement of either shaft relative to said member.

6. A torsionally-flexible driving coupling for a pair of co-axial shafts, comprising resilient means connecting said shafts together to resist relative motion therebetween within a predetermined range, and gear means drivably connecting said shafts together and coacting with said resilient means to increase the effectiveness of the latter means to decrease said range.

7. A continuously torsionally-flexible driving coupling comprising, in combination, a pair of co-axial shafts, one driving and the other driven; two concentric flanges, each connected to its respective shaft near the adjacent end thereof to turn therewith; a generally annular member intermediate said flanges and concentric with said shafts; two spur gears each connected to a respective one of said shafts adjacent the end thereof; a plurality of unitary two-gear pinions, each journalled in said intermediate member to engage both of said spur gears; a first spring means connecting the flanges with the intermediate member to resiliently oppose their relative angular displacement; and a second spring means tending to bias the flanges toward the intermediate member to frictionally oppose the relative angular movement between said member and each of said flanges.

8. The driving coupling set forth in claim 3 in which the second-named spur gears are segmental.

CLINTON H. HAVILL.

REFERENCES CITED

The following references are of record in the file of this patent:

UNITED STATES PATENTS

| Number | Name | Date |
|---|---|---|
| 1,440,847 | Sundh | Jan. 2, 1923 |
| 2,096,999 | Sarazin | Oct. 26, 1937 |
| 2,079,009 | Gregg | May 4, 1937 |
| 2,114,247 | Davis | Apr. 12, 1938 |

FOREIGN PATENTS

| Number | Country | Date |
|---|---|---|
| 439,210 | Great Britain | 1935 |
| 772,673 | France | 1934 |